United States Patent [19]

Nielsen, Jr.

[11] 4,080,811
[45] Mar. 28, 1978

[54] LOCKING DEVICES FOR ELECTRIC METER BOXES

[76] Inventor: Anker J. Nielsen, Jr., 410 Bailey Rd., Holden, Mass. 01520

[21] Appl. No.: 660,400

[22] Filed: Feb. 23, 1976

[51] Int. Cl.² ............................................. B65D 55/14
[52] U.S. Cl. ........................................ 70/164; 70/232; 70/DIG. 34; 292/256; 292/DIG. 11
[58] Field of Search ................. 70/14, 19, 57, 77, 91, 70/158, 163, 164, 166, 167, 170, 171, 232, DIG. 19, DIG. 34, 63; 292/256, 258, 327, DIG. 11, 289, 291, 293; 317/107, 109–111; 220/224, 225; 24/81 R, 81 E, 81 PB

[56] References Cited

U.S. PATENT DOCUMENTS

| | | | |
|---|---|---|---|
| 1,053,328 | 2/1913 | Suters | 70/19 |
| 1,343,851 | 6/1920 | Roe | 292/DIG. 11 |
| 1,554,958 | 9/1925 | Falk | 70/232 X |
| 3,088,560 | 5/1963 | Preuss | 24/81 PB X |
| 3,181,319 | 5/1965 | Hudon | 292/289 X |
| 3,431,004 | 3/1969 | Schell | 292/258 |
| 3,867,822 | 2/1975 | Morse et al. | 70/164 |
| 3,938,839 | 2/1976 | Collier | 292/258 |

OTHER PUBLICATIONS

Automotive Industries, Apr. 1, 1942, p. 43.

*Primary Examiner* — Roy D. Frazier
*Assistant Examiner* — William E. Lyddane
*Attorney, Agent, or Firm* — Robert K. Randall

[57] ABSTRACT

The present device is a means for preventing unauthorized access to an electric meter box, and comprises a clamp holding the box lid shut, the clamp being locked in place overhanging the lid by a bolt through a bracket fixed on the box wall and a bolt type lock passed through registering holes in the clamp and bracket. All parts except the overhanging and adjacent portion of the clamp and a small portion of the lock are shielded from tampering by an enclosing yoke locked in place by the lock.

4 Claims, 6 Drawing Figures

LOCKING DEVICES FOR ELECTRIC METER BOXES

The present invention purposes to offer a check to the growing problem of tampering with the electric meter to arrest or reverse its running or otherwise effect the theft of current, and aims to attain such safeguard at a minimum cost and effort. Countless numbers of these meter boxes are presently installed and in use with no bar to illegitimate access to their contents save frangible seals serving only as tell-tales after the act.

The invention comprises a clamp to hold the box lid shut, a bracket fixing the clamp to the box, a key-operated bolt type lock holding the clamp in lid-locking relation, and a yoke or housing shielding the co-engaging portions of the clamp and bracket and the lock and locked in place by the lock, all installed without requiring any change or work on the box structure. An illustrative embodiment of the invention is shown in the accompanying drawings in which FIG. 1 is a front view of a meter box as mounted on a wall, with the novel lock in place.

Figure 1:
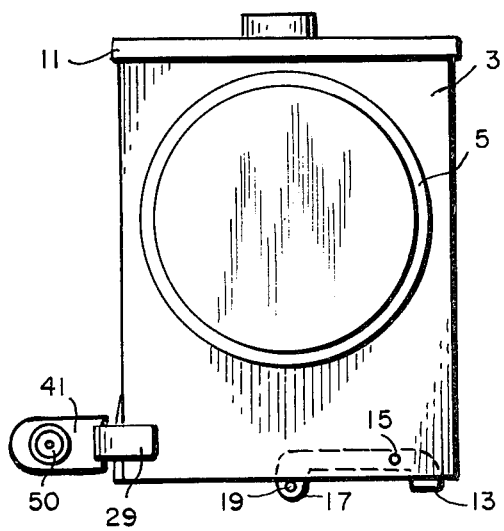
Figure 2:
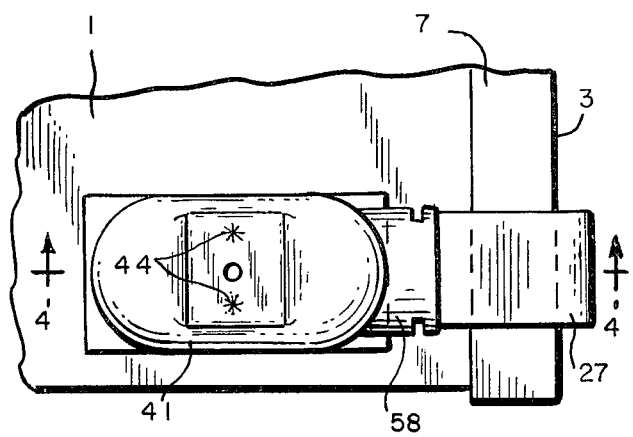
FIG. 2 is a side elevation of a corner of the same with part of the box broken away.
Figure 3:
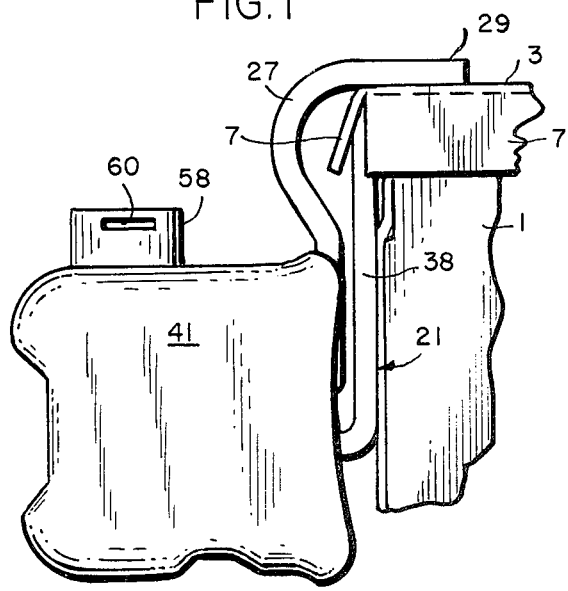
FIG. 3 is a bottom view of the same with part of the box broken away.

The meter box is of conventional design and construction, made of sheet metal stampings, with a rectangular body 1 having internal meter mounts and a lid 3 with central aperture 5 for the glass bowl of a meter, flanges 7 on three edges, and with its top edge held under an overhang 11 on the top front of the body 1. The usual latch 13 is pivoted at 15 on the underside of the lid, with its end 17 extensible through registering slots in the lid and body to hold the lid closed, and having the usual hole 19 for insertion of the bail of a conventional frangible seal.

The novel locking means of the invention comprises a bracket 21 of heavy gauge and hardened rigid metal of L-shape having one limb 23 of the L doubled back upon itself so as to hook over and embrace the edge of the box body at any desired point in its periphery, and to be fixed firmly in place by cap-screw 25 threaded through it and bearing against the inner surface of the chosen box wall on which the bracket is mounted.

On this bracket 21 is mounted a Z-shaped clamp 27 likewise of heavy gauge and hardened rigid metal one limb 29 of which overlies the marginal area of the lid 3. The other limb 31 is drawn and held under tension toward the limb 33 of bracket 21 by a cap-screw 35 put through limb 31 and threaded into tapped hole 39 in the limb 33 of the bracket, such limb extending at an angle, preferably a right angle, to the portion 38 which is clamped against the box wall by the action of screw 25.

The outward extremity 36 of limb 31 is bent toward limb 33 of the bracket to engage limb 33 and form a fulcrum such that tightening of screw 35 causes limb 29 of the clamp 27 to be held under continuous stress or tenson to bear hard against the lid 3 of the box to hold it shut. A keeper 40 of rubber on screw 35 guards against loss in handling.

A yoke or protective housing or cover 41 of heavy, rigid metal stock encloses much of the clamp 27 and the limb 33 of bracket 21 except the portion of 27 overlying the lid 1. This yoke is a cup-shaped unitary steel stamping 42 of U-section with a second U-section insert 43 welded at 44 to the flat bottom of the outer element. The sides of the U-section insert 43 are bowed inward toward each other to define with the flat sides of the outer element a space receiving and loosely fitting the combined volume of the outstanding limbs 31 and 33 plus the head of screw 35.

Figure 4:
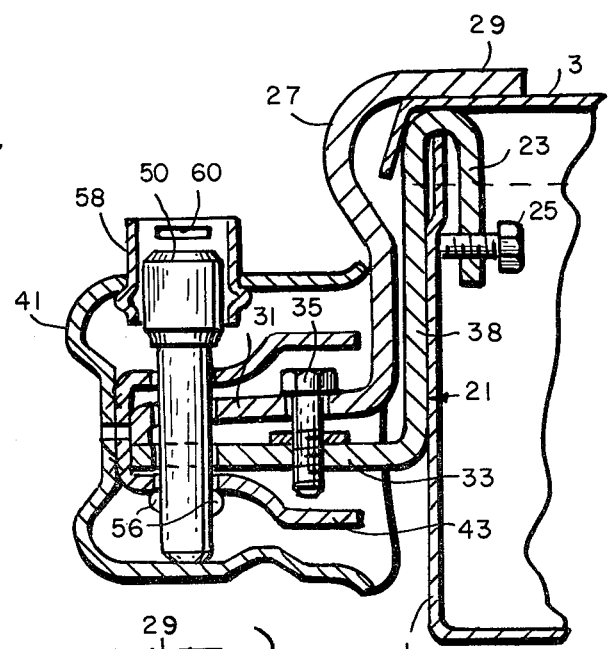
FIG. 4 shows the locking device in horizontal section on line 4—4 of FIG. 2.
Figure 5:
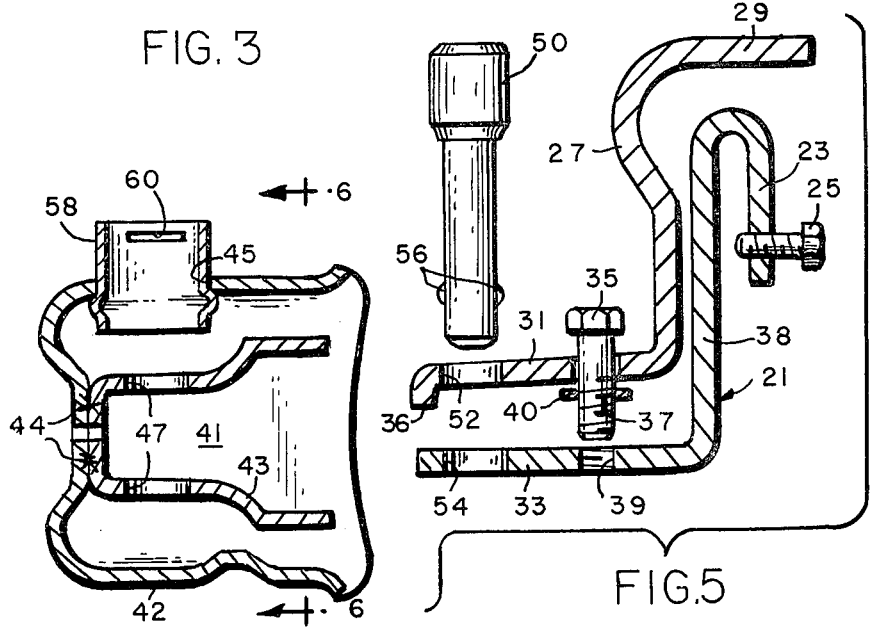
FIG. 5 is an exploded view of the parts of the locking device.
Figure 6:
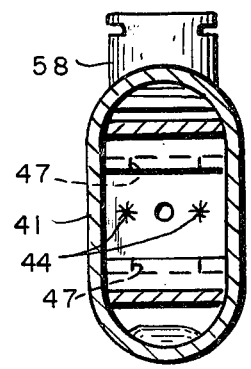
FIG. 6 is a sectional view of the yoke taken on line 6—6 of FIG. 5.

A hole 45 in one wall of the yoke 41 and holes 47 in the insert 43 aligned therewith are provided to receive as shown in FIG. 4 the head and barrel portions respectively of a bolt lock 50 of the well-known type shown in Morse and Nielsen U.S. Pat. Nos. 1,923,035 and 3,714,802. Holes 52 and 54 are provided in the limbs 31 and 33 respectively of the clamp and bracket which holes are in alignment with each other, and also with the holes 45 and 47 when the screw 35 is tightened and the yoke 41 is seated over the limbs and against the clamp 27. Thus disposed, the bolt lock 50 is inserted in these 5 aligned holes till it bottoms on the inner wall of the cup 42 and its locking balls 56 are extruded beyond hole 47 radially to a distance exceeding the diameter of this hole 47 upon removal of the key to the lock (not shown), after the usual manner of use of these locks.

Thus disposed, the lid 3 of the meter box cannot be opened because it is held shut by the overlying portion 29 of the clamp 27, and the latter cannot be displaced because the bolt lock 50 through holes 52 and 54 prevents it from being swung about screw 35 to free the lid. But with the bolt lock unlocked and withdrawn from the holes and the yoke removed and screw 35 loosened the clamp 27 is easily swung about screw 35 to free the lid and give access to the interior of the meter box.

Since no boring of holes or the making of any structural changes in the box is required, the installation of the novel locking device is accomplished without disturbing the box or its contents in their position as installed on the wall, in a brief moment, and with no tools other than wrench and screw driver. The latter tool serves also to spring the flange 7 outward slightly if needed to accommodate the portion 23 of the bracket 21.

A sleeve 58 to enclose the head of the bolt lock 50 may be added to the yoke 41 as shown, with a slot 60 for the bail of a seal (not shown) barring access to the keyhole of the lock, if such a tell-tale seal to reveal tampering is desired.

While I have illustrated and described a certain form in which the invention may be embodied, I am aware that many modifications may be made therein by any person skilled in the art, without departing from the scope of the invention as expressed in the claims. Therefore, I do not wish to be limited to the particular form shown, or to the details of construction thereof, but What I do claim as my invention is:

1. A lock device capable of lockingly interconnecting a lid and a body of an electric meter box, said lock device comprising
   a metal bracket having an elongated central portion with one end bent so as to form a U-shape with the adjacent part of the elongated central portion, and a second end which extends away from a plane defined by said elongated central portion and in a direction opposite to the bent direction of said one end;

means for retaining the U-shaped section of said metal bracket on an edge of the body of the electric meter box;

a metal clamp having an elongated central portion positioned adjacent to said elongated central portion of said metal bracket with a first limb bent away from a plane defined by the elongated central portion of the same side thereof as the bend of said one end of said metal bracket, and a second limb which extends away from the plane defined by the central portion and in a direction opposite to the bent direction of said first limb, said first limb being capable of retaining an edge of the lid of the electric meter box between itself and said metal bracket;

means for rigidly interconnecting said second limb of said metal clamp to said second end of said metal bracket;

a housing means for enclosing said second limb, said second end and said means for rigidly interconnecting said second limb and said second end; and means for locking said housing means to said second limb and said second end.

2. The lock device of claim 1 wherein said means for retaining said U-shaped section of said metal bracket on an edge of the body of the electric meter box comprises a screw means; wherein said one end of said metal bracket has an aperture therein; and wherein said screw means is threadedly engaged in said aperture to press said central portion of said metal bracket against the body of the electric meter box.

3. The lock device of claim 1 wherein said means for rigidly interconnecting said second limb and said second end comprises a cap-screw; wherein said second end of said metal bracket has a first hole therein; wherein said second limb of said metal clamp has a first hole therein; and wherein said cap-screw is received in said first hole of said second limb and is threadedly engaged in said first hole of said second end.

4. The lock device of claim 1 wherein said housing means comprises a cup-shaped structure having a U-section insert therein and attached thereto which is positioned to enclose said second limb and second end; wherein said cup-shaped structure has a hole therein; wherein said second end has a second hole therein; wherein said second limb has a second hole therein; and wherein said means for locking said housing means to said second limb and said second end comprises a bolt lock positioned to extend through said hole in said cup-shaped structure, said second hole in said second limb and said second hole in said second end.

* * * * *